Figure 5:
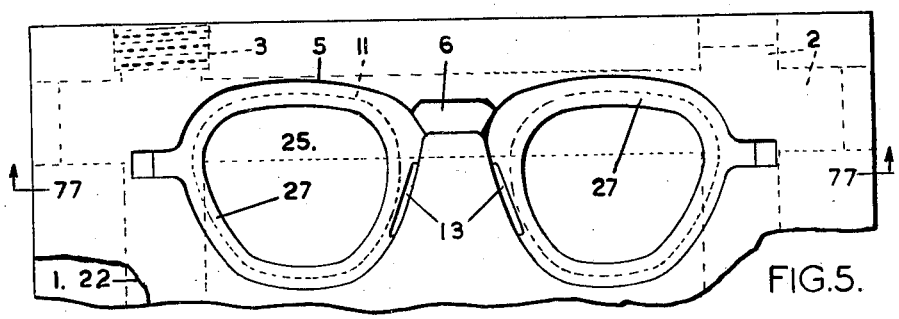

March 18, 1952     L. J. MONCRIEFF     2,589,419
METHOD OF FORMING ARTICLES SUCH AS SPECTACLE FRAMES
Filed June 24, 1948     2 SHEETS—SHEET 1
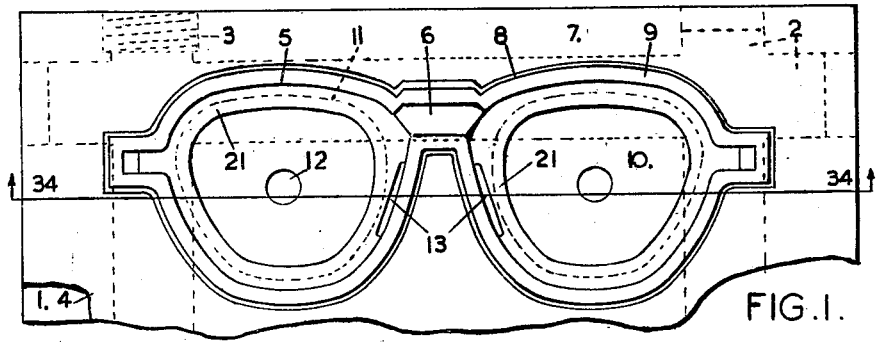
FIG.1.
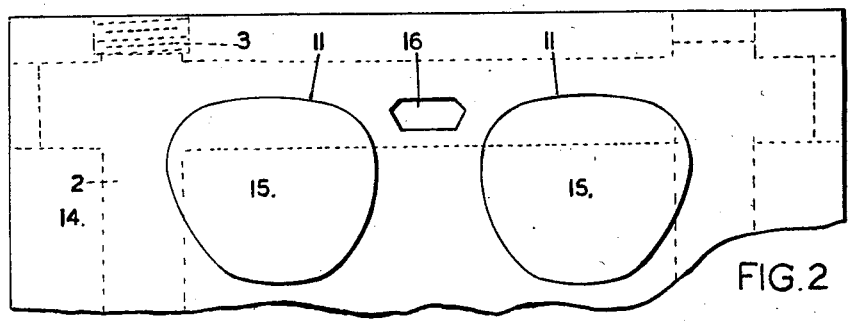
FIG.2
FIG.3
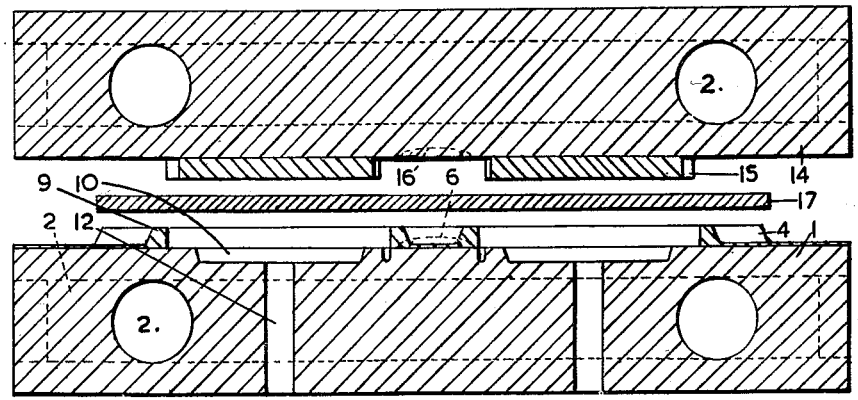
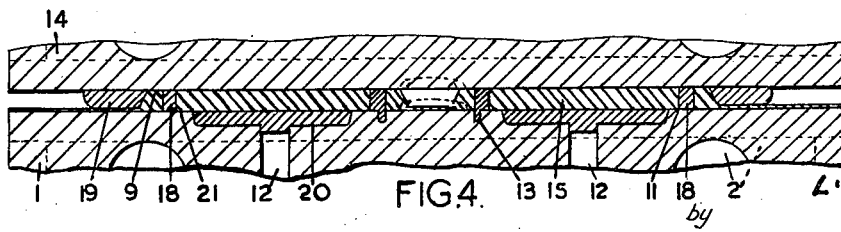
FIG.4.
Inventor
L. J. MONCRIEFF
by
Attorneys Inventor
L. J. MONCRIEFF

UNITED STATES PATENT OFFICE 2,589,419

METHOD OF FORMING ARTICLES SUCH AS SPECTACLE FRAMES

Leslie John Moncrieff, London, England, assignor to Celanese Corporation of America, a corporation of Delaware Application June 24, 1948, Serial No. 34,889
In Great Britain July 11, 1947

7 Claims. (Cl. 18—56)

This invention relates to frames, and like articles comprising a frame or rim, and especially to the manufacture of spectacle frames from thermoplastic sheet material, for example of plasticised cellulose acetate.

Spectacle frames are made on a large scale from sheet material having a basis of plasticised cellulose acetate. The method employed is to mill the sheet material to the desired shape. The present invention provides a more rapid and economic method of making spectacle frames and other articles from thermoplastic sheet material and one capable of giving a stronger product.

According to the present invention, a process for the production of articles from thermoplastic sheet material comprises pressing a thermoplastic sheet, of a thickness less than the average thickness of the article and at a temperature at which the thermoplastic material of the sheet flows freely under the pressure applied, between two die members and, by relative motion between said members, severing the article from the sheet at the boundaries of the article while, over at least part of the length of said boundaries, squeezing across said boundaries some of the material of the sheet lying originally outside said boundaries, so as to form an article having at least part of its area adjoining said boundaries of greater thickness than said sheet.

The process is particularly applicable to the production of spectacle frames and other frames, in which case the frame can be severed from the sheet at the internal and external boundaries thereof, and material can be squeezed across both the internal and external boundaries to form a frame which, over its whole area, is of greater thickness than the sheet from which it is formed. Examples of frames other than spectacle frames that can be produced by the process of the invention are such articles as hand-lens holders, frames for small mirrors and other small articles and rings of various sections. The process may be applied, however, to other articles than frames, e. g. to plate-like articles which have a rim of greater thickness than the sheet from which they are formed while the article as a whole is mainly of the same thickness as the sheet. Thus, plates or shallow dishes with reinforced rims, or mirror holders comprising both a back and a holding rim for a mirror, can be formed in this way.

The advantages of the process of the invention over the method of milling out the article from sheet material include very much higher speed; less waste in that the thickness of the article is greater than that of the sheet used; and greater strength in the product. In addition the working of the process does not require either a high degree of skill or the use of machine tools. Compared with compression moulding methods the invention has the advantage of giving a product that does not require any substantial finishing operation and the possibility of working directly from sheet material affords a further advantage. Injection moulding which might also be used to give the same kind of product involves the use of elaborate and expensive apparatus and also of finishing operations.

For carrying out the process described above for the production of articles from thermoplastic sheet material, a pair of die members are utilized. A pair of die members are formed with opposing surfaces adapted, when the members are brought to a closed position, to meet over lines constituting the boundaries of the article and, for at least part of the length of said boundaries, to meet also over narrow areas lying immediately outside said lines whereby the material of a sheet pressed between said die members is squeezed from said areas across said boundaries to augment the thickness of the sheet within said boundaries, the remainder of said opposing surfaces being separated when the members are in the closed position. The die members are employed in a press, to the platens of which the members are attached, and which is capable of exerting a pressure sufficient to bring the die members to a closed position when a sheet having a basis of plasticised cellulose acetate or other suitable thermoplastic material at an appropriate temperature is disposed between them.

The narrow areas over which the die members meet can be constituted by the flat top of a narrow steep-sided ridge on one die engaging with a flat face on the other die, or by the engagement and overlapping of a plateau on one die with a similarly shaped but slightly smaller recess in the other die. Thus, in a pair of dies for a spectacle frame, one die can be formed with two suitably spaced flat-topped projections of the profile of the lens areas of the frame, which are adapted to register with similarly shaped but slightly smaller wells in the other die, the overlapping of the projections beyond the edges of the wells providing the narrow area of contact adjacent to the inner boundaries of the frame, which are defined by the profiles of the projections. The external periphery of the frame may be similarly defined, and a narrow area of contact surrounding it provided, by forming a recess of the desired profile in the second-mentioned die, registering with a similarly shaped but slightly larger plateau on the first-mentioned die, the projections and the wells previously described being formed respectively on the said plateau and in the bottom of the said recess. Alternatively, however, a narrow ridge may be formed on either die, having a flat top adapted to engage with a flat face of the other die, and having an inner surface following the line of the external periphery of the spectacle frame.

Elsewhere than at the boundaries of the article and over the narrow areas of contact adjoining the boundaries, the opposing faces of the die members are spaced apart to receive the sheet material. Within the boundaries of the article, of course, this spacing corresponds to the thickness of the article, and may vary locally as desired to provide for projections or areas of increased thickness that may be required in the article. Outside the boundaries, the spacing should in general be sufficient to accommodate the thickness of the sheet material. However, in making spectacle or other frames, the recess representing the interior of the frame may be barely equal to, or even slightly less than the thickness of the sheet, and may be formed with a bore or passage for the escape of excess material.

The heating of the thermoplastic sheet to the temperature necessary to enable the material thereof to flow freely under the pressure applied can be effected by the provision of heating means in the die members, e. g. passages for the flow steam or hot water, or by the heating of the platens of the press in which the die members are used, or by pre-heating the sheet itself or by any combination of these methods. After the article has been formed and before it is removed from the die members it is desirable that it should be cooled to give it sufficient stability of form to be handled. Where the die members or the press platens are heated by passing steam or hot water through passages formed therein, cooling can be effected by passing cold water through the same passages. Alternatively, however, reliance may be placed on air-cooling of the die members and of the article contained therein before stripping of the article from the die.

Figure 6:
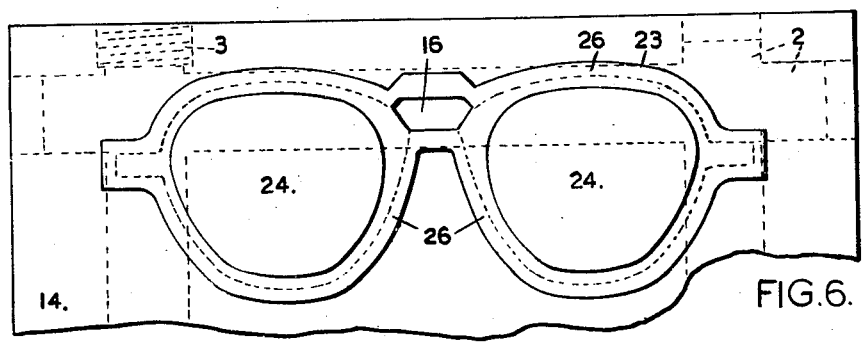
Figure 7:
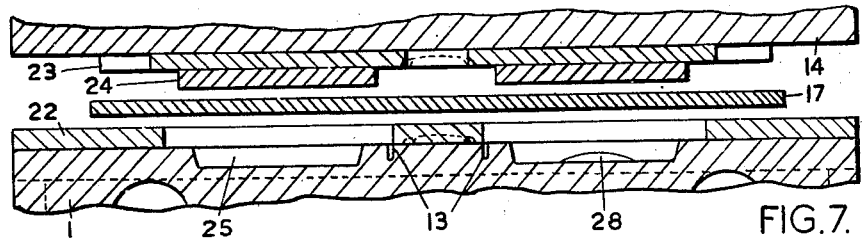
Figure 8:
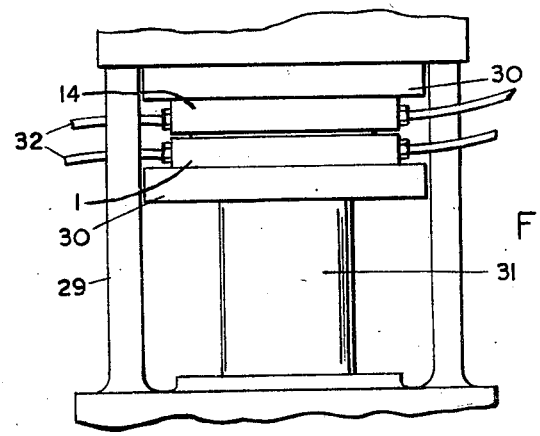

By way of example two pairs of die members of slightly different form for the production of spectacle frames, and the method of using them for carrying out the process of the present invention, will now be described in greater detail with reference to the accompanying drawings in which, Fig. 1 is a view of the upper face of one lower die member, Fig. 2 is a view of the lower face of the corresponding upper die member, Fig. 3 is a side elevation, in section along the line 3—4 of Fig. 1 of the die members of Figs. 1 and 2 in the separated position, Fig. 4 is a similar view of the engaging faces of the die members in the closed position, Figs. 5, 6 and 7 are views similar to 1, 2 and 3 respectively of a pair of die members of slightly different form, Fig. 7 being a section along the line 7—7 of Fig. 5, and Fig. 8 is a front elevation of a press in which the pairs of die members shown in Figs. 1 to 7 can be used.

Referring to Figs. 1 to 4, the pair of die members shown therein constitute a multiple die set for the simultaneous production of three or four spectacle frames though the members in Figs. 1 and 2 are broken away so that only the mould cavities for the uppermost spectacle frame are shown. The lower die member shown in Fig. 1 comprises a lower die-plate 1 formed with interconnected passages 2 through which steam or hot water, or cold water, can be passed by way of an inlet 3 and an outlet (not shown) in the diagonally opposite corner of the die-plate. Secured to the upper face of the die-plate 1 is a plate 4 which is milled away, inside a line 5 representing the outer periphery of the desired form of frame, except over the area 6 which is only partly cut away so as to leave a convex portion for moulding the inner surface of the bridge-piece of the frame. The thickness of the plate 4 is equal to the thickness required of the frame. The plate 4 is also partly milled away over an area 7, outside the line of a steep chamfer 8, to a depth equal to or slightly exceeding the thickness of the sheet from which the frame is to be moulded. Thus the thickness of the plate 4 may be 4 mm. and the depth to which the area 7 is cut away may be 3 mm. Between the line 5 and the innermost of the lines 8 is a narrow flat-topped ridge 9 formed by leaving the plate 4 at its original thickness. Within the area circumscribed by the line 5, wells 10 are hobbed out of the die-plate 1 itself, each smaller than the inner or lens area of the spectacle frame, the lens area being indicated in Fig. 1 by the dotted lines 11. In the middle of each of the wells 10 is drilled a passage 12 extending completely through the die-plate 1. Also hobbed in the die-plate 1 are two narrow recesses 13 suitably shaped for the moulding of nose pads on the spectacle frame.

The upper die member, shown in Fig. 2, comprises an upper die-plate 14 having passages 2 formed therein similar to those shown in Fig. 1 and having affixed thereto blocks 15 having, as their outer profiles, the lines 11 of the lens areas. Each of the blocks 15 constitutes a plateau of a depth equal to the thickness of the plate 4, i. e. to the thickness required of the spectacle frame to be produced. The upper die-plate 14 is recessed at 16 over an area similar in shape to the area 6 so as to form the raised bridge-piece of the spectacle frame.

In use, the die-plates 1, 14 are secured to the platens of a press, of the kind to be described with reference to Fig. 8, are heated by the passage of steam or hot water through the passages 2, and a flat sheet of thermoplastic material 17 (Fig. 3) of a thickness less than that of the plate 4 and the blocks 15 is placed between them. The die-plates are then brought together under pressure in the manner indicated in Fig. 4, whereupon the spectacle frame is formed at 18 in the cavity between the dies, a waste portion 19 is cut off from the sheet outside the lines 8 of Fig. 1, and a waste portion 20 is cut off inside the lens area. The upper and lower dies meet over the area of the narrow ridge 9 and over a further narrow area 21 (Figs. 1 and 4) between the periphery of the wells 10 and the periphery 11 of the lens area. The material of the sheet coinciding with the areas 9 and 21 is pinched between the dies, and part thereof is squeezed into the cavity 18 until the cavity is completely filled, notwithstanding the fact that its depth is greater than the thickness of the sheet 17. The depth of the wells 10 is barely equal to the thickness of the sheet 17 but, in order to allow the escape of excess material which may be squeezed into the well from the area 21, the passages 12 are provided, into and through which the material of the sheet can pass under pressure. The material squeezed into the cavity 18 from the areas 9, 21 is sufficient to fill the recesses 13 forming the nose pads of the frame, and to provide the additional material required to form the bridge-piece between the areas 6, 16. The bridge piece may be of the same thickness as the rest of the frame, or slightly thicker if desired.

The pair of die members shown in Figs. 5 to 7 are similar to those shown in Figs. 1 to 4. The plate 22, however, fixed to the lower die-plate 1 and corresponding to the plate 4 of Fig. 1, is cut away only within the peripheral line 5 of the frame so as to form a simple recess, and not outside that line as over the area 7 in Fig. 1. On the upper die-plate 14 an intermediate plate 23 is provided on which eyepiece blocks 24 similar to the blocks 15 of Fig. 2 are mounted. The plate 23 constitutes a plateau of a shape similar to that outlined by the lines 8 in Fig. 1, and the bridge-piece recess 16 is formed in the plate 23. In Figs. 5-7 the wells 25 in the middle of the lens areas are shown slightly deeper than the thickness of the sheet 17. The two die members meet over outer pinch areas 26 (Fig. 6) where the plate 23 of Fig. 6 overlaps outside the lines 5 of Fig. 5, and over inner pinch areas 27 (Fig. 5) (as at 21 in Figs. 1 to 4) where the eyepiece blocks 24 overlap outside the peripheries of the wells 25. The greater depth of the wells 25 prevents the development of excessive pressure by the trapping of the sheet material within the boundaries thereof, so that the provision of passages 12 as in Figs. 1-4 is not necessary. If it should be found desirable to provide a little back-pressure within the wells, to prevent too much material being squeezed from the areas 27 into the well instead of into the cavity in which the spectacle frame is formed, a small button or dome-shaped member 28 as shown in the right-hand eyepiece of Fig. 7 can be dropped into the bottom of each well.

Fig. 8 shows a form of press in which the die members shown in Figs. 1-4 or those shown in Figs. 5-7, can be used. The press comprises a heavy frame 29, and platens 30, the lower platen being mounted on a hydraulic ram 31. The lower and upper die plates, 1, 14 are secured to the lower and upper platens 30 respectively. Pipe connections 32 for the supply of steam or hot water or cold water are provided for connection to the inlets 3 and the outlets of the die-plates 1, 14. The press is capable of exerting a total pressure of 50 tons which is adequate for the simultaneous formation of 3 or 4 spectacle frames.

In carrying out the operation, the platens with the die members thereon are separated, and a sheet of plasticised cellulose acetate of a thickness of about ⅔rds to ⅘ths of the thickness required in the article is placed between. The temperature of the plates 1, 14 having been raised to about 240° F. by the supply of steam to the passage 2, the press is closed and the frame is formed in the manner described above with reference to Figs. 1-4. Cold water, instead of steam, is then passed through the passages 2 to cool the die members, the press is opened and the frames are removed.

The cycle of operations takes some 2 or 3 minutes (as against 15-25 minutes required to mill a frame from sheet material as has hitherto been done) and a moulding is obtained which needs substantially no finishing. Any undue sharpness of the edges of the articles, and any slight flash that may occur can readily be removed by an inexpensive tumbling operation and the frames are then ready, after the routing out of a groove to take the lens, for use as part of a finished pair of spectacles.

Instead of heating the die members by passing steam through the passages 2, it is possible to preheat the sheet 17 before inserting it between the die members. Moreover, instead of positively cooling the die members by cold water passed through the passages 2, reliance may be placed on air-cooling before the frames are stripped from the dies. Another procedure that can be adopted for the heating of the thermoplastic material is to heat the die members indirectly by heating the platens 30 of the press, which may be done by means of steam passages or the electrical heating elements that are often supplied with such presses. This procedure, however, tends to increase the time cycle for the production of the articles on account of the greater bulk and heat capacity of the platens and of the time taken in alternately heating and cooling them. In order to overcome this drawback, a pair of presses can be used, the platens of only one of them being heated. After the die members have been brought together under pressure and heated by contact with the platens of the heated press, the press can be opened, and the whole die-set with its contents can be slid into the other press, by means of which pressure is applied and maintained until the die-set and its contents are cooled. This gives a much shorter time cycle as the platens are maintained at a constant temperature and only the die-set and its contents are heated and cooled.

The invention has been described with particular reference to the use of cellulose acetate as the thermoplastic material to be used. Other thermoplastic polymers can however form the basis of the sheet material, e. g. other esters of cellulose, including cellulose nitrate, cellulose nitrate-acetate, cellulose propionate, cellulose butyrate, cellulose acetate-propionate, cellulose acetate-butyrate, cellulose acetate-stearate, cellulose ethers including ethyl cellulose and benzyl cellulose, thermoplastic vinyl and vinylidene compounds including polystyrene, polyethylacrylate, polymethyl methacrylate and co-polymers of vinyl chloride with vinylidene chloride, with vinyl acetate, with acrylonitrile, methacrylonitrile or an acrylic or methacrylic ester, polymers and copolymers of ethylene and thermoplastic condensation polymers including polyhexamethylene adipamide.

The sheet material will of course where necessary contain a plasticiser for the polymer. Other constituents that may be present in the sheet material include pigments, effect-materials, stabilizers and fillers (provided that these do not preclude the necessary free flow of the material under the temperature and pressure of operation).

Having described my invention, what I desire to secure by Letters Patent is:

1. Process for forming articles from thermoplastic sheet material, said process comprising pressing a thermoplastic sheet, of a thickness less than the average thickness of the article to be formed and at a temperature at which the thermoplastic material of the sheet flows freely under the pressure applied, between two die members and, by relative motion between said members, severing the article from the sheet at the boundaries of the article while, over at least part of the length of said boundaries, squeezing across said boundaries some of the material of the sheet lying originally outside said boundaries, so as to form an article having at least part of its area adjoining said boundaries of greater thickness than said sheet.

2. Process for forming spectacle frames and other frames from thermoplastic sheet material, said process comprising pressing a thermoplastic sheet, of a thickness less than the average thickness of the frame to be formed and at a temperature at which the thermoplastic material of the sheet flows freely under the pressure applied, between two die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

3. Process for forming spectacle frames and other frames from thermoplastic sheet material, said process comprising pressing a thermoplastic sheet, of a thickness less than the average thickness of the frame to be formed and at a temperature at which the thermoplastic material of the sheet flows freely under the pressure applied, between two heated die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

4. Process for forming spectacle frames and other frames from thermoplastic sheet material, said process comprising pressing a heated thermoplastic sheet, of a thickness less than the average thickness of the frame to be formed and at a temperature at which the thermoplastic material of the sheet flows freely under the pressure applied, between two die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

5. Process for forming spectacle frames and other frames from thermoplastic sheet material, said process comprising pressing a thermoplastic sheet of plasticized cellulose acetate, of a thickness less than the average thickness of the frame to be formed and at a temperature at which the thermoplastic material of the sheet flows freely under the pressure applied, between two die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

6. Process for forming spectacle frames and other frames from thermoplastic sheet material, said process comprising pressing a thermoplastic sheet of plasticized cellulose acetate, of a thickness less than the average thickness of the frame to be formed and at a temperature at which the thermoplastic material of the sheet flows freely under the pressure applied, between two heated die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

7. Process for forming spectacle frames and other frames from thermoplastic sheet material, said process comprising pressing a heated thermoplastic sheet of plasticized cellulose acetate, of a thickness less than the average thickness of the frame to be formed and at a temperature at which the thermoplastic material of the sheet flows freely under the pressure applied, between two die members and, by relative motion between said members, severing the frame from the sheet at the external and internal boundaries of the frame while squeezing across said external and internal boundaries some of the material of the sheet lying originally outside said boundaries so as to form a frame of greater thickness than said sheet.

LESLIE JOHN MONCRIEFF.

REFERENCES CITED

The following references are of record in the file of this patent:

UNITED STATES PATENTS

| Number | Name | Date |
|---|---|---|
| 1,182,598 | Strauss | May 9, 1916 |
| 1,571,067 | Schumacher | Jan. 26, 1926 |
| 1,573,356 | Person | Feb. 16, 1926 |
| 1,856,319 | Cooper | May 3, 1932 |
| 2,048,686 | Conklin | July 28, 1936 |